United States Patent [19]

Hoffman

[11] 4,380,160

[45] Apr. 19, 1983

[54] TRAILER TOW LOCKING DEVICE

[76] Inventor: William F. Hoffman, 17 Brook Dr., Hope Valley, R.I. 02832

[21] Appl. No.: 228,067

[22] Filed: Jan. 26, 1981

[51] Int. Cl.³ .................... E05B 73/00; E05B 67/38
[52] U.S. Cl. ................................................ 70/14; 70/56
[58] Field of Search ............... 70/14, 54, 56, 34, 229, 70/232, 259, 417

[56] References Cited

U.S. PATENT DOCUMENTS

| | | | |
|---|---|---|---|
| 3,736,016 | 5/1973 | Garvey | 70/56 |
| 3,844,143 | 10/1974 | Hudson | 70/14 |
| 4,106,315 | 8/1978 | Dohanyos | 70/56 |

FOREIGN PATENT DOCUMENTS

| | | | |
|---|---|---|---|
| 2822839 | 11/1979 | Fed. Rep. of Germany | 70/14 |
| WO81/00832 | 4/1981 | PCT Int'l Appl. | 70/14 |

*Primary Examiner*—Robert L. Wolfe

*Attorney, Agent, or Firm*—Albert W. Hilburger

[57] ABSTRACT

Apparatus for deterring theft of trailers which utilize a tow ring having a central opening and upper and lower annular surfaces. The apparatus assumes the operational position when the upper surface of a base plate is positioned proximate to the lower surface of the tow ring and the lower surface of a top plate is positioned proximate to the upper surface of the tow ring. When assuming this operational position, a tongue integral with and upstanding from the base plate extends through the central opening of the tow ring and through an aperture formed in the top plate. The tongue has at least one hole located between its free end and the upper surface of the top plate to receive the shank of a padlock when the apparatus is in the operational position. A cover member is integral with the top member and overlies the free end of the tongue to protect the lock in its secured condition.

5 Claims, 6 Drawing Figures

TRAILER TOW LOCKING DEVICE

BACKGROUND OF THE INVENTION

1. Field of the Invention

The present invention relates generally to protective devices for trailer tow rings, and more particularly, to improved devices for deterring theft of a trailer.

2. Description of the Prior Art

It is customary for heavy flatbed trailers used for transporting heavy construction equipment such as bulldozers and the like to employ a ring hitch at their forward ends to which a traction vehicle can be readily attached and detached. A construction which is generally representative of the Prior Art is disclosed in the U.S. patent to Schoneberg, U.S. Pat. No. 2,835,510 issued May 20, 1958. That patent discloses a draw bar hitch which is reasonably well secured against accidental or unintended separation of the tractor and the implement to be drawn, but does not provide protection against their intentional separation. Indeed, the cited patent did not concern itself with such intentional separation of the driving and the driven elements.

Other patents disclose allegedly theft deterrent trailer hitch lock devices for use with trailer hitches of the type employing a ball and socket construction. The patents to Vuillemot, U.S. Pat. No. 3,884,055 issued May 20, 1975 and to Allen et al., U.S. Pat No. 4,032,171 issued June 28, 1977 are representative of such constructions. However, in each instance, the construction disclosed provides for security in the form of a padlock which is fully exposed. By reason of such exposure, a thief or unauthorized person would encounter a minimum of difficulty to remove the padlock in that the shank of the padlock could be easily cut or the body of the padlock smashed away from the shank. Such activity would thereby eliminate the benefits of the inventions as disclosed in those patents.

Apparently to provide for added protection against the elements and against vandals, constructions such as those disclosed in the patents to Hudson, U.S. Pat. No. 3,844,143 issued Oct. 29, 1974 and to Bulle, U.S. Pat. No. 4,186,575 issued Feb. 5, 1980 disclosed devices which the inventor, in each instance, claims to be effective in preventing theft of trailers employing a tow ring. Although the locking mechanisms in both instances are protected to a greater degree than in the constructions disclosed in the patents, they appear to be fragile, can be adversely affected by the weather, and are somewhat complex in their construction.

With proper deference being given the aforesaid patents, each of which, on its face, disclosed advances in the state-of-the-art of the construction of tow hitches and protective devices therefor, when each respective patent was granted, nonetheless, the present invention is deemed to be a considerable improvement over such known devices. Indeed, it was with recognition of the need and of the state of the prior art that the present invention was conceived and has now been reduced to practice.

SUMMARY OF THE INVENTION

To this end, apparatus is disclosed for deterring theft of trailers which utilize a tow ring having a central opening and upper and lower annular surfaces. The apparatus assumes the operational position when the upper surface of a base plate is positioned proximate to the lower surface of the tow ring and the lower surface of a top plate is positioned proximate to the upper surface of the tow ring. When assuming this operational position, a tongue integral with and upstanding from the base plate extends through the central opening of the tow ring and through an aperture formed in the top plate. The tongue has at least one hole located between its free and the upper surface of the top plate to receive the shank of a padlock when the apparatus is in the operational position. A cover member is integral with the top member and overlies the free end of the tongue to protect the lock in its secured condition.

It might also be desireable to provide the tongue with a pair of spaced apart holes at locations differing in distance from the free end so as to accommodate tow rings of various thicknesses. In a preferred configuration of the invention, the base plate and the top plate have substantially circular outer edges and the tongue is mounted to the base plate at a central location and is perpendicular to the base plate. Additionally, it is within the scope of the invention to provide fixed gates at either end of the cover member to constrict the passageway and, thereby, even further reduce the ability of a thief to gain access to the padlock.

Thus, a primary feature of the invention is to provide a device which, simultaneously, is substantially unaffected by the weather and which can deter theft of a trailer of the type which employs a tow ring. Another feature of the invention resides in its inexpensive construction and in its economy of maintenance. To achieve this end, the invention employs existing and standard materials and is of simplified construction. Furthermore, although the invention can be fabricated in a variety of sizes, one preferred size would fit the majority of trailer tow rings such that a user or supplier would not be required to maintain a large inventory of the device. Also, by reason of its construction, any standard padlock can be utilized in conjunction with the apparatus disclosed herein.

Other and further features, objects, advantages, and benefits of the invention will become apparent from the following description taken in conjunction with the following drawings. It is to be understood that both the foregoing general description and the following detailed description are exemplary and explanatory but are not restrictive of the invention. The accompanying drawings which are incorporated in and constitute a part of this invention, illustrate one embodiment of the invention and, together with the description, serve to explain the principles of the invention.

DETAILED DESCRIPTION OF THE DRAWINGS

DESCRIPTION OF THE PREFERRED EMBODIMENT

Figure 1:
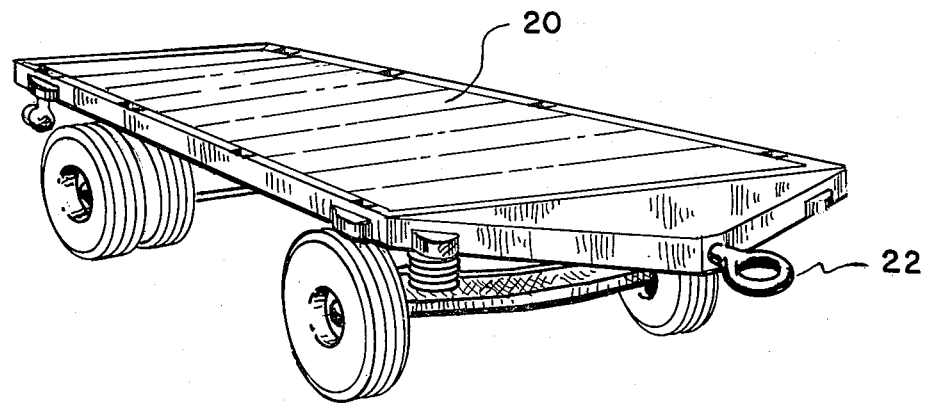
FIG. 1 is a perspective view of a trailer incorporating a tow ring of the type which can utilize the benefits of the present invention.

Refer now to the drawings, and initially to FIG. 1 which generally illustrates a trailer 20 including a tow ring 22 at its forward end and adapted to incorporate a device 24 (see FIGS. 2 and 3) which serves to deter theft of the trailer. The trailer 20 is illustrated as being of the flatbed variety which customarily utilize the tow ring type of hitch, but it will be understood that the invention, in the form of the device 24, is applicable to any type of trailer or implement which utilizes a tow ring type of hitch.

In accordance with the invention, then, apparatus is disclosed for deterring theft of trailers which utilize a tow ring having a central opening and upper and lower annular surfaces comprising: a base plate having an upper surface; an upstanding tongue integral with said base plate and including a free end distant from said base plate, said tongue adapted for reception through the central opening of the tow ring when said upper surface of said base plate is positioned proximate to the lower annular surface of the tow ring; a top plate having upper and lower surfaces and an aperture therethrough for slideably receiving said tongue when said lower surface of said top plate is positioned proximate to the upper annular surface of the tow ring; said apparatus being in the operational position when said upper surface of said base plate is positioned proximate to the lower annular surface of the tow ring and said lower surface of said top plate is positioned proximate to the upper annular surface of the tow ring and said tongue extends through the aperture in said top plate; and a cover member having spaced apart flanges fixed to said upper surface of said top plate and upstanding therefrom and a web portion integral with said flanges and spaced from said upper surface of said top plate; said tongue having a hole therethrough at a location intermediate said free end and said upper surface of said top plate adapted to receive the shank of a locking device when said apparatus assumes the operational position.

Figure 2:
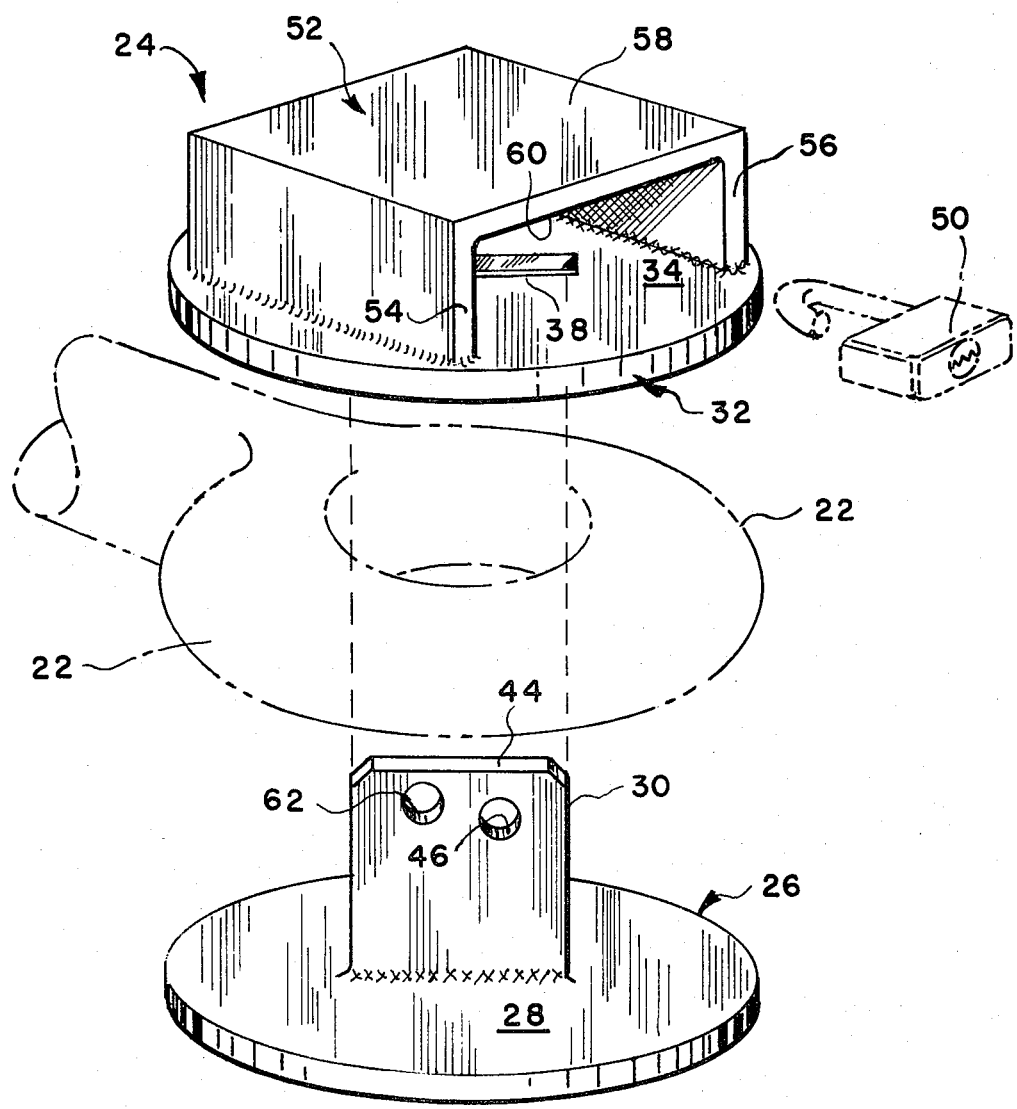
FIG. 2 is an exploded view illustrating the elements of the invention in solid lines and elements not considered part of the invention in phantom.
Figure 3:
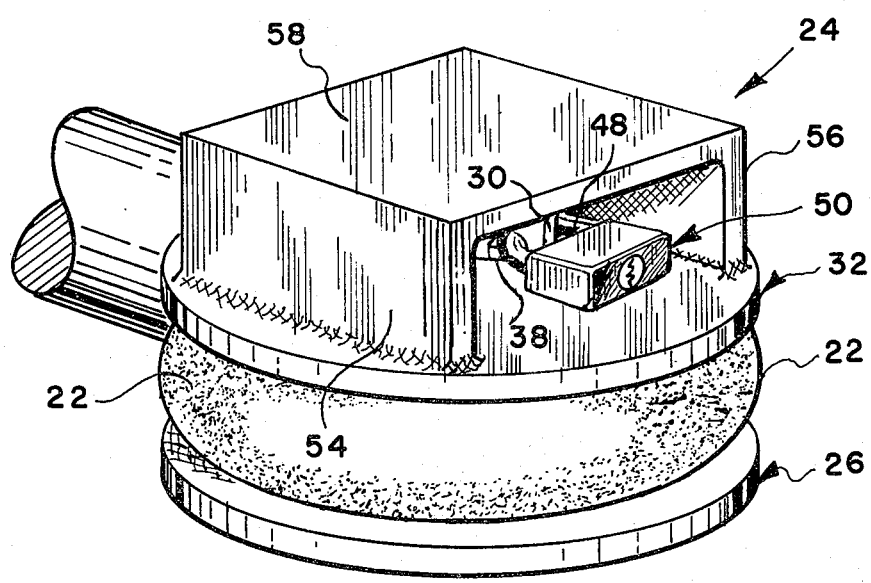
FIG. 3 is a perspective view illustrating the invention in its operational position.

As embodied herein, and with particular reference now to FIG. 2 which illustrates the invention in an exploded condition and to FIG. 3 which illustrates the invention in its operational position, the device 24 is seen as being of a two piece construction when ready for use. The first piece includes a base plate 26 having an upper surface 28 and an upstanding tongue 30 intregal with the base plate 26. Preferably, the base plate 26 is composed of heavy metal plate material having anticorrosive qualities or other appropriate solid construction grade materials. Typically the base plate 26 would be composed of steel having a 5/16-inch thickness and the tongue 30 may be of a similar material welded to the upper surface 28 of the base plate 26.

The device 24 also includes a top plate 32 having an upper surface 34 and a lower surface 36 (see FIG. 4) and an aperture 38 for reception of the tongue 30 when the device 24 assumes the operational position.

The device 24 assumes the operational position when the upper surface 28 of the base plate 26 is positioned proximate to a lower annular surface 40 of the tow ring 22 and the lower surface 36 of the top plate 32 is positioned proximate to an upper annular surface 42 of the tow ring 22. Simultaneously, the tongue 30 extends through the aperture 38 which is of sufficient magnitude to freely receive the tongue. As can be particularly well seen in FIG. 4, the tongue 30 extends through the aperture 38 and has a free end 44 distant from the base plate 26 and also distant from the upper surface 34 when the device 24 assumes the operational position. With continued reference to FIG. 4, the tongue 30 has a hole 46 therethrough intermediate the upper surface 34 and the free end 44. The hole 46 is of a size sufficient to freely receive a shank 48 of a padlock 50 or other suitable security device.

The device 24 further includes a cover member 52 having spaced apart flanges 54 and 56 fixed to the upper surface of the top plate 32 and lying in planes transverse to the upper surface 34. A web portion 58 is integral with the flanges 54 and 56 and spaced from the upper surface 34. In practice, a preferred construction of the cover member 52 would be an American Standard Channel nominally sized 5×1¾ although other sizes could be adequately utilized. In any event, the flanges 54 and 56 would be suitably secured to the upper surface 34 of the top plate 32 in any suitable manner, but, preferably by welding. As with the base plate 26 and the top plate 32, the cover member 52 is preferably composed of a heavy metal plate material having anti-corrosive qualities or other appropriate solid construction grade materials. Typically the top plate 32 would be composed of steel having a 5/16-inch thickness.

Figure 4:
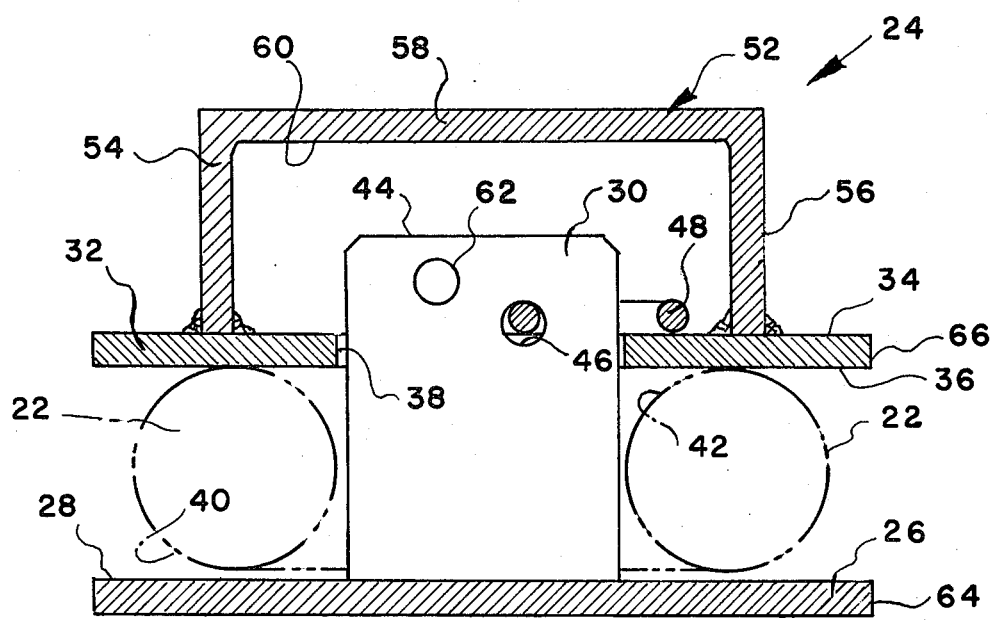
FIG. 4 is an elevational cross-section illustrating the invention in its operational position.

With the invention in its operational position as seen in FIGS. 3 and 4, the tow ring 22 is sandwiched between the base plate 26 and the top plate 32. In turn, these plates are held against substantial relative movement by the shank 48 of the padlock 50 passing through the hole 46 in the tongue 30. With the provision of the cover member 52 such that it completely overlies the padlock 50 (see FIG. 5), there is little liklihood that an unauthorized person could remove the padlock 50 from engagement with the hole 46 of the tongue 30 without a key, or in the instance of a combination padlock, without knowledge of the appropriate combination. FIGS. 3 and 4 indicate that the upper surface 34, the flanges 54, and the web 58 define a passageway 60. While this passageway is sufficiently sized to receive the padlock 50 for its attachment and removal by an authorized person possessing a key or the appropriate combination, the passageway does not readily permit insertion of a tool sufficiently sized to remove the padlock 50.

In accordance with the invention, the device 24 is generally as previously described wherein said tongue has a pair of spaced apart holes therethrough at locations differing in distance from said free end and intermediate said free end and said upper surface of said top plate when said apparatus assumes the operational position, each of the holes being adapted to receive the shank of a locking device.

As embodied herein, with continuing reference to FIG. 4, the tongue 30 is preferably provided with a pair of spaced apart holes 46, as already seen, and 62, one being nearer to the free end 44 than the other. In this manner, the device 24 can be applied to tow rings 22 of varying thicknesses. Indeed, the tongue 30 may be provided with even additional holes if that should be considered desirable, with the understanding that there is a space limitation by reason of the web 58.

In accordance with the invention, the device is generally as previously described wherein said base plate and said top plate have substantially circular outer edges and wherein said tongue is mounted to said base plate centrally thereof and wherein the aperture in said top plate is located centrally thereof.

Figure 5:
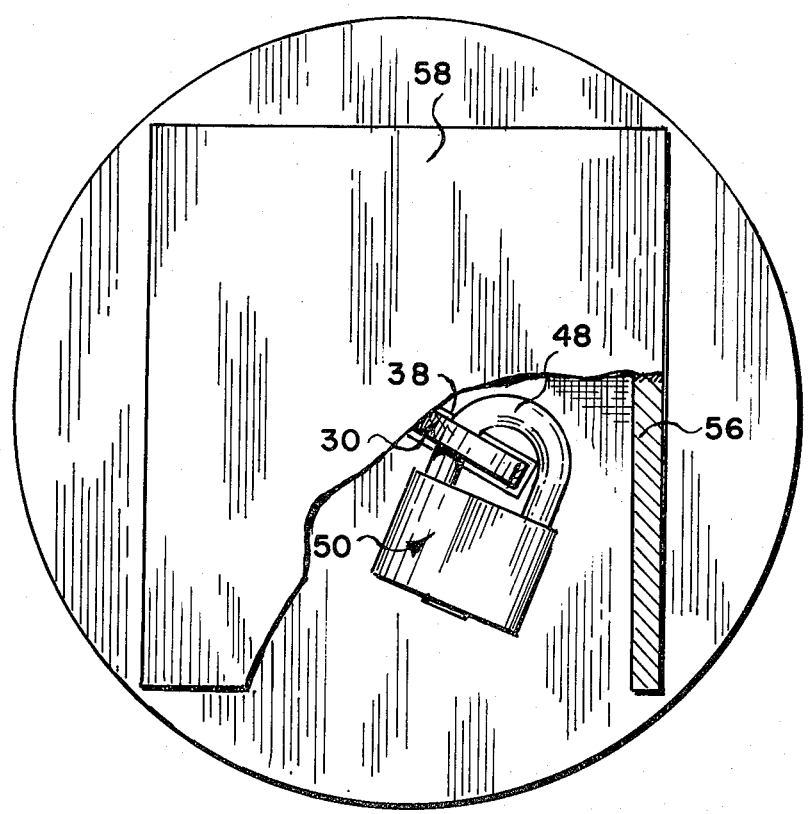
FIG. 5 is a top-plan view of the invention, certain parts being cut away and illustrated in section for purposes of clarity.

As embodied herein, with continuing reference to FIGS. 4 and 5, in a preferred configuration the device 24 has a base plate 26 with a substantially circular outer edge 64 and the top plate has a substantially circular outer edge 66 so as, in both instances, to be substantially concentric with the annular outer surface of the tow ring 22. Furthermore, the tongue 30 is preferably mounted in the central regions of the upper surface 28 of the base plate 26 and, similarly, the aperture 38 is preferably positioned centrally of the top plate 32.

In accordance with the invention, the device is generally as previously described wherein said base plate and said top plate lie in substantially parallel spaced apart planes when said apparatus assumes the operational position and wherein said tongue is perpendicular to said base plate.

As embodied herein, and with particular reference to FIGS. 4 and 5, when the device 24 assumes the operational position such that the upper surface 28 lies proximate to the lower annular surface 40 and the lower surface 36 lies proximate to the upper annular surface 42, the top plate 32 and the base plate 26 lie in substantially parallel planes spaced apart by substantially the thickness of the tow ring 22. In a preferred embodiment of the invention, the tongue 30 is perpendicular to the upper surface 28 of the base plate 26, such a design being particularly desirable for ease of manufacture.

In accordance with the invention, the device is generally as previously described wherein said cover member is a channel having spaced apart ends and defining a passageway in the region formed by said flanges and said web portion and said top plate and including gate means fixed to said channel at said ends to constrict the passageway.

Figure 6:
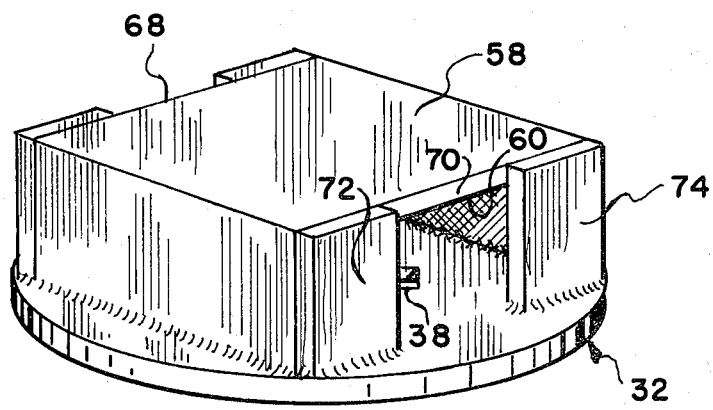
FIG. 6 is a perspective view of a portion of the invention in a modified configuration.

As embodied herein and with particular reference with FIGS. 4 and 6, the cover member 52 has previously been described as preferably being a standard channel. As such, it has spaced apart ends 68 and 70 and, together with the top plate 32, defines a passageway 60 for receiving the free end of the tongue 30 and the padlock 50. While the passageway 60 provides adequate space for the normal insertion and removal of the padlock 50, it does not permit adequate space for insertion of any tool for improperly removing the padlock 50. In order to even further improve the theft deterrent characteristics of the device 24 it may be considered desirable to add a pair of gates or barriers 72 and 74 fixed to the cover member 52 at its ends 68 and 70 and to the top plate 32 in a suitable fashion, as by welding, to further constrict the passageway 60. In this manner, access to the padlock 50 can be made even more difficult for an unauthorized person while still enabling an authorized person to have adequate access to the padlock.

The invention, in its broader aspects, is not limited to the specific details shown and described; departures may be made from such details without departing from the principles of the invention.

What I claim is:

1. Apparatus for deterring theft of trailers which utilize a tow ring having a central opening and upper and lower annular surfaces comprising:

a base plate having an upper surface;

an upstanding tongue integral with said base plate and including a free end distant from said base plate, said tongue adapted for reception through the central opening of the tow ring when said upper surface of said base plate is positioned proximate to the lower annular surface of the tow ring;

a top plate having upper and lower surfaces and an aperture therethrough for slideably receiving said tongue when said lower surface of said top plate is positioned proximate to the upper annular surface of the tow ring;

said apparatus being in the operational position when said upper surface of said base plate is positioned proximate to the lower annular surface of the tow ring and said lower surface of said top plate is positioned proximate to the upper annular surface of the tow ring and said tongue extends through the aperture in said top plate; and a cover member having spaced apart flanges fixed to said upper surface of said top plate and upstanding therefrom and a web portion integral with said flanges and spaced from said upper surface of said top plate; said tongue having a hole therethrough at a location intermediate said free end and said upper surface of said top plate adapted to receive the shank of a locking device when said apparatus assumes the operational position.

2. Apparatus as set forth in claim 1 wherein said tongue has a pair of spaced apart holes therethrough at locations differing in distance from said free end and intermediate said free end and said upper surface of said top plate when said apparatus assumes the operational position, each of the holes being adapted to receive the shank of a lock.

3. Apparatus as set forth in claim 1 wherein said base plate and said top plate have substantially circular outer edges and wherein said tongue is mounted to said base plate centrally thereof and wherein the aperture in said top plate is located centrally thereof.

4. Apparatus as set forth in claim 1 wherein said base plate and said top plate lie in substantially parallel spaced apart planes when said apparatus assumes the operational position and wherein said tongue is perpendicular to said base plate.

5. Apparatus as set forth in claim 1 wherein said cover member is a channel having spaced apart ends and defining a passageway in the region formed by said flanges and said web portion and said top plate and including gate means fixed to said channel at said ends to constrict the passageway.

* * * * *